(12) United States Patent
Davenport

(10) Patent No.: US 11,231,100 B2
(45) Date of Patent: Jan. 25, 2022

(54) GEAR CASE ASSEMBLY FOR A WATERCRAFT PROPULSION SYSTEM

(71) Applicant: BRP US INC., Sturtevant, WI (US)

(72) Inventor: Mike Davenport, Pleasant Prairie, WI (US)

(73) Assignee: BRP US INC.

( * ) Notice: Subject to any disclaimer, the term of this patent is extended or adjusted under 35 U.S.C. 154(b) by 260 days.

(21) Appl. No.: 16/670,108

(22) Filed: Oct. 31, 2019

(65) Prior Publication Data

US 2020/0132182 A1    Apr. 30, 2020

Related U.S. Application Data

(60) Provisional application No. 62/753,390, filed on Oct. 31, 2018.

(51) Int. Cl.

| F16H 57/038 | (2012.01) |
| B63H 23/06 | (2006.01) |
| F16H 57/023 | (2012.01) |
| F16H 63/30 | (2006.01) |
| F16H 61/04 | (2006.01) |

(52) U.S. Cl.
CPC .......... F16H 57/038 (2013.01); B63H 23/06 (2013.01); F16H 57/023 (2013.01); F16H 2061/0474 (2013.01); F16H 2063/3093 (2013.01)

(58) Field of Classification Search
CPC ................. F16H 57/038; F16H 57/023; F16H 2061/0474; F16H 2063/3093; B63H 23/06
USPC .......................................................... 74/325
See application file for complete search history.

(56) References Cited

U.S. PATENT DOCUMENTS

| 3,382,839 | A | * | 5/1968 | Kiekhaefer | .......... | B63H 5/1252 |
| | | | | | | 440/55 |
| 4,600,395 | A | * | 7/1986 | Pichl | ...................... | B63H 20/10 |
| | | | | | | 440/112 |
| 4,907,994 | A | * | 3/1990 | Jones | ...................... | B63H 5/125 |
| | | | | | | 440/111 |
| 5,151,059 | A | | 9/1992 | Higby | | |
| 5,601,464 | A | | 2/1997 | Ogino et al. | | |
| 6,390,866 | B1 | * | 5/2002 | Nystrom | ................ | B63H 5/125 |
| | | | | | | 440/57 |
| 7,530,863 | B2 | | 5/2009 | Ito et al. | | |
| 8,460,041 | B2 | | 6/2013 | Davis et al. | | |
| 9,481,436 | B2 | | 11/2016 | Shomura et al. | | |

(Continued)

FOREIGN PATENT DOCUMENTS

GB    2152164 A    7/1985

*Primary Examiner* — Ha Dinh Ho
(74) *Attorney, Agent, or Firm* — BCF LLP

(57) ABSTRACT

An gear case assembly for a watercraft propulsion system has a gear case housing, a driveshaft with a partially threaded bore defined in an end thereof, and a propeller shaft. The propeller shaft and the driveshaft are angled relative to each other. A bevel gear is mounted to the propeller shaft. A pinion mounted to the end of the driveshaft. The pinion meshes with the bevel gear. The pinion defines a central aperture. A fastener is disposed at least in part in the central aperture of the pinion. The fastener fastens the pinion to the end of the driveshaft. The fastener has a head and a shank. The shank is at least partially threaded. The shank extends into the bore of the driveshaft. An outboard motor having the gear case assembly is also disclosed.

20 Claims, 9 Drawing Sheets

(56) References Cited

U.S. PATENT DOCUMENTS

| | | | |
|---|---|---|---|
| 2006/0052014 A1* | 3/2006 | Kobayashi | B63H 20/00 440/53 |
| 2006/0172630 A1* | 8/2006 | Kawamoto | B63H 5/08 440/75 |
| 2009/0203271 A1* | 8/2009 | Okabe | B63H 20/14 440/75 |

* cited by examiner

US 11,231,100 B2

GEAR CASE ASSEMBLY FOR A WATERCRAFT PROPULSION SYSTEM

CROSS-REFERENCE

The present application claims priority to U.S. Provisional Patent Application No. 62/753,390, filed Oct. 31, 2018, the entirety of which is incorporated herein by reference.

FIELD OF TECHNOLOGY

The present technology relates to gear case assemblies for watercraft propulsion systems.

BACKGROUND

One common type of watercraft propulsion system is the outboard motor. Outboard motors have a motor, such as an internal combustion engine, that is covered by a cowling and connected to a gear case assembly, and the gear case assembly is connected to a propeller. Part of a gear case assembly 300, which is an exemplary embodiments of a prior art gear case assembly, is shown in FIG. 1 and is described below.

The gear case assembly 300 has a gear case housing 302. A driveshaft 304 has a lower end extending in the gear case housing 302 and the opposite end connected to the motor. A pinion 306 is mounted to the lower end of the driveshaft 304. The driveshaft 304 has splines 308 and an external thread 310 below the splines 308. The pinion 306 has splines that engage the splines 308 of the driveshaft 304. A nut 312 is screwed onto the external thread 310 of the driveshaft 304 to fasten the pinion 306 to the driveshaft 304. As can be seen, the nut 312 extends partially inside the pinion 306 and mostly below the pinion 306 in order to be accessible with a tool to tighten the nut 312. In an alternative embodiment, the nut 312 is completely recessed inside the pinion 306, but a space is provided radially between the nut 312 and the pinion 306 in order to leave space for a different type of tool, such as a socket wrench, to engage the nut 312.

The pinion 306 meshes with front and rear bevel gears 314, 316. The bevel gears 314, 316 are rotationally mounted to a propeller shaft 318. The propeller shaft 318 is perpendicular to the driveshaft 304. A clutch dog 320 is splined onto the propeller shaft 318 between the two bevel gears 314, 316. A shifting mechanism 322 is connected to the clutch dog 320 and moves the clutch dog 320 between a front position, a rear position and a neutral position. In the neutral position, the clutch dog 320 is disengaged from both bevel gears 314, 316 and the driveshaft does not drive the propeller shaft 318. In the front position, the clutch dog 320 engages the front bevel gear 314 such that the driveshaft 304 drives the propeller shaft 318 in a first direction via the front bevel gear 314. In the rear position, the clutch dog 320 engages the rear bevel gear 316 such that the driveshaft 304 drives the propeller shaft 318 in a second direction, opposite the first position, via the rear bevel gear 316. The propeller (not shown) is mounted to the propeller shaft 318.

The amount of torque that can be transferred from the motor to the propeller is determined in part by the contact area between the pinion 306 and the bevel gears 314, 316. The use of the nut 312 limits how small the lower diameter of the pinion can be. As such, to have a sufficient contact area between the pinion 306 and the bevel gears 314, 316, the size of the upper diameter of the pinion 306 has to be relatively large, and the bevel gears 314, 316 need to be correspondingly large. As such, the gear case housing 302 needs to be big enough to accommodate the pinion 306 and the gears 314, 316. As would be understood, the larger the gear case housing 302 is, the more drag it generates in the water.

It would therefore be desirable to have a gear case assembly that has a smaller pinion and smaller bevel gears, while permitting the same amount of torque transfer, in order to have a smaller gear case housing.

One solution is described in U.S. Pat. No. 8,460,041, issued Jun. 11, 2013 to Seven Marine LLC. In one of the embodiments of the '041 patent, the driveshaft drives two pinions in parallel, and each pinion drives two bevel gears. All four bevel gears are mounted on the propeller shaft. As such, for the same amount of torque transfer from the driveshaft to the propeller shaft, the size of the pinions and bevel gears of this embodiment of the '041 patent can be smaller than those of the gear case assembly 300 described above. As such, the gear case housing of this embodiment of the '041 patent can also be narrower.

However, the mechanism of the '041 patent is more complex, requires more parts and is therefore more expensive and longer to assemble than that of the gear case assembly 300.

There is therefore a desire for a gear case assembly that is compact while limiting the complexity, number of parts and assembly time.

SUMMARY

It is an object of the present technology to ameliorate at least some of the inconveniences present in the prior art.

The present technology provides a gear case assembly for a watercraft propulsion system in which the prior art nut used to fasten the pinion on the end of the driveshaft has been replaced by a threaded fastener which is fastened inside the driveshaft to fasten the pinion on the end of the driveshaft. As a result, the diameter of the parts responsible for the connection of the pinion to the driveshaft is reduced. Thus, the diameter of the lower end of the pinion can also be reduced. Accordingly, for an equivalent diameter of the upper end of the pinion, the smaller diameter of the lower end of the present pinion permits the transfer of more torque as the length of the teeth of the pinion is increased and can therefore have a greater contact surface with teeth of a corresponding bevel gear provided on the propeller shaft. Alternatively, the diameter of the upper end of the pinion can be reduced and, due to the smaller diameter of the lower end of the pinion, still provide the same length of teeth as a prior art arrangement having bigger diameters at the upper and lower ends, and can therefore transfer the same amount of torque. By having a smaller diameter of the upper end of the pinion, the overall width of the gear case assembly can be reduced, thereby reducing the hydrodynamic drag of the gear case assembly.

According to one aspect of the present technology, there is provided an outboard motor gear case assembly having a gear case housing; a driveshaft extending at least in part into the gear case housing, the driveshaft defining a bore in an end thereof, the bore being at least partially threaded, the bore being coaxial with the driveshaft; a propeller shaft having a first portion extending into the gear case housing and a second portion extending out of the gear case housing, the propeller shaft and the driveshaft being angled relative to each other; a bevel gear mounted to the propeller shaft; a pinion mounted to the end of the driveshaft, the pinion meshing with the bevel gear, the pinion defining a central aperture; and a fastener disposed at least in part in the central aperture of the pinion, the fastener fastening the pinion to the end of the driveshaft, the fastener comprising a head and a shank, the shank being at least partially threaded, the shank extending into the bore of the driveshaft.

In some embodiments of the present technology, a portion of the pinion is held between the head of the fastener and the end of the driveshaft.

In some embodiments of the present technology, the fastener is a screw.

In some embodiments of the present technology, the screw is a socket screw; and the head of the fastener defines a socket.

In some embodiments of the present technology, the central aperture of the pinion has a counterbore; the head of the fastener is received in the counterbore; and the head of the fastener is disposed completely between opposed faces of the pinion.

In some embodiments of the present technology, the central aperture of the pinion has a counterbore; the head of the fastener is received in the counterbore; the counterbore has a counterbore diameter; the head of the fastener has a head diameter; and a ratio of the head diameter to the counterbore diameter is greater than 0.8.

In some embodiments of the present technology, the head of the fastener defines a recess for receiving a tool used to fasten the fastener in the driveshaft; and the recess faces the propeller shaft.

In some embodiments of the present technology, the end of the driveshaft is received in the central aperture of the pinion.

In some embodiments of the present technology, the end of the driveshaft is frustoconical; and a portion of the central aperture receiving the end of the driveshaft is frustoconical.

In some embodiments of the present technology, the head of the fastener is received at least in part in the central aperture of the pinion; and a portion of the central aperture of the pinion receiving the head of the fastener is cylindrical.

In some embodiments of the present technology, the pinion defines a ring disposed between the frustoconical and cylindrical portions of the central aperture of the pinion; an inner diameter of the ring is smaller than a diameter of the cylindrical portion; the inner diameter of the ring is smaller than a minor diameter of the frustoconical portion; and the ring is held between the head of the fastener and the end of the driveshaft.

In some embodiments of the present technology, the end of the driveshaft has external splines; and the central aperture of the pinion has internal splines engaging the external splines of the end of the driveshaft.

In some embodiments of the present technology, a bearing is disposed between the end of the driveshaft and the gear case housing for rotationally supporting the driveshaft in the gear case housing. The bearing is disposed completely between the pinion and a free end of the shank of the fastener in a direction defined by a driveshaft axis of the driveshaft.

In some embodiments of the present technology, a portion of the driveshaft defines a screw pump. The gear case assembly also has a bearing disposed between the end of the driveshaft and the gear case housing for rotationally supporting the driveshaft in the gear case housing. The bearing is disposed completely between the pinion and the screw pump in a direction defined by a driveshaft axis of the driveshaft.

In some embodiments of the present technology, the shank of the fastener extends in part into the portion of the driveshaft defining the screw pump.

In some embodiments of the present technology, the bevel gear is a first bevel gear. The gear case assembly also has a first bearing rotationally mounting the first bevel gear to the propeller shaft; a second bevel gear mounted to the propeller shaft, the second bevel gear meshing with the pinion, a driveshaft axis of the driveshaft extending between the first and second bevel gears; a second bearing rotationally mounting the second bevel gear to the propeller shaft; and a clutch dog mounted to the propeller shaft between the first and second bevel gears. The clutch dog is rotationally fixed to the propeller shaft. The clutch dog is axially movable along the propeller shaft between a first position, a second position and an neutral position. In the first position, the clutch dog engages the first bevel gear such that the driveshaft drives the propeller shaft via the first bevel gear in a first direction. In the second position, the clutch dog engages the second bevel gear such that the driveshaft drives the propeller shaft via the second bevel gear in a second direction opposite the first direction. In the neutral direction, the clutch dog is disengaged from the first and second bevel gears.

In some embodiments of the present technology, the pinion and the bevel gear are spiral bevel gears.

In some embodiments of the present technology, the central aperture of the pinion has a counterbore; the head of the fastener is received at least in part in the counterbore; the counterbore has a counterbore diameter; the head of the fastener has a head diameter; an extremity of the end of the driveshaft has an end diameter; the head diameter is less than the counterbore diameter; and the counterbore diameter is less than the end diameter.

In some embodiments of the present technology, the propeller shaft is perpendicular to the driveshaft.

According to another aspect of the present technology, there is provided an outboard motor having a motor; a cowling covering at least part of the motor; the gear case assembly according to the above aspect and any one of the above embodiments with the driveshaft being operatively connected to the motor; and a propeller mounted to the second portion of the propeller shaft.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

For purposes of the present application, terms related to spatial orientation, such as front, rear, upper and lower, should be understood with reference to an outboard motor mounted to a stern of a watercraft, with the outboard motor steered in a straight ahead direction, and with a driveshaft of the outboard motor extending vertically.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A gear case assembly 100 will be described below with respect to an outboard motor 10. It is contemplated that at least some aspects of the gear case assembly 100 could be used on other watercraft propulsion systems such as a sterndrive or a pod drive for example.

Figure 1:
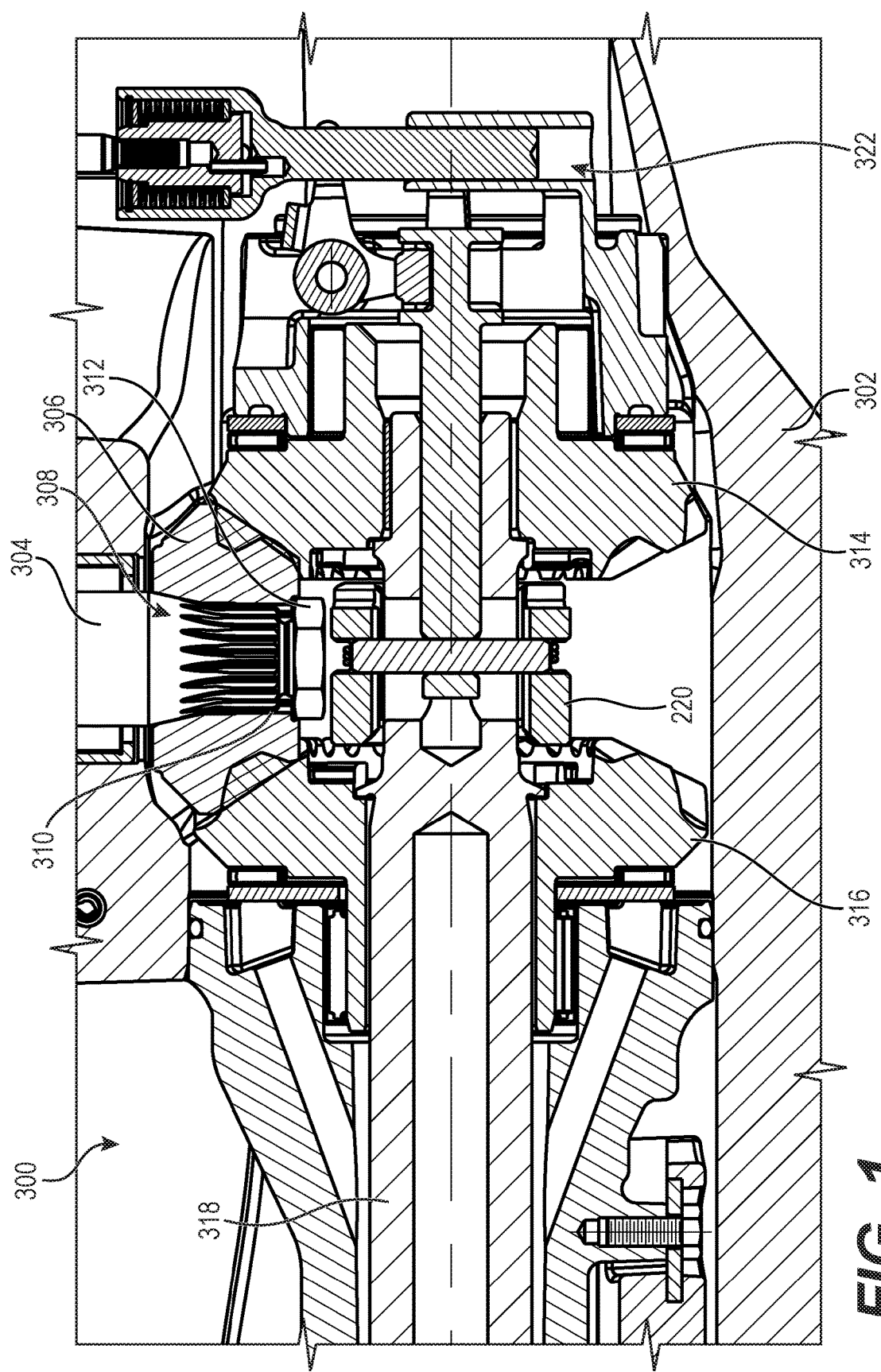
FIG. 1 is a close-up of a cross-sectional view of a prior art gear case assembly showing transmission components.
Figure 2:
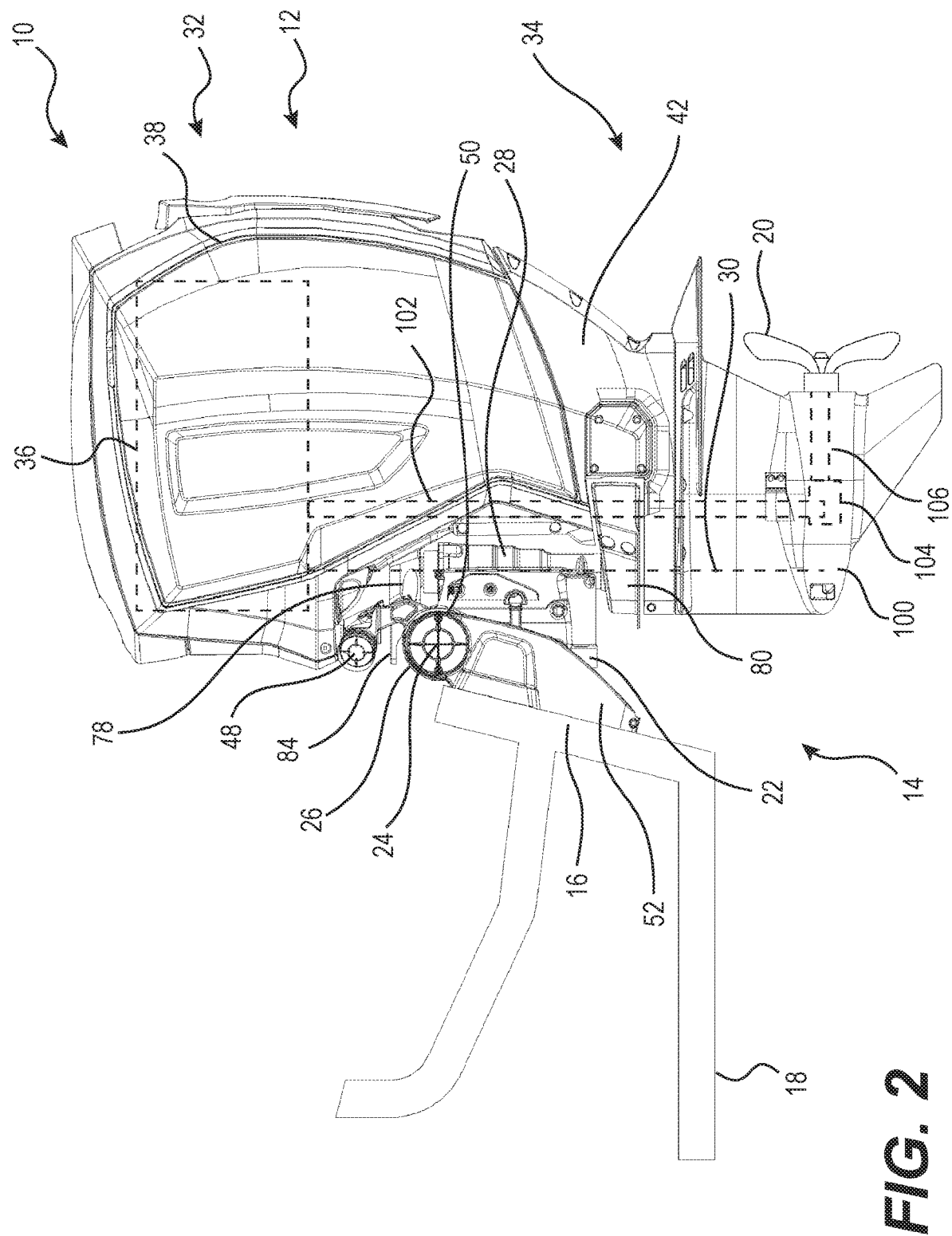
FIG. 2 is a left side elevation view of an outboard motor.

With reference to FIG. 2, the outboard motor 10, shown in the upright position, includes a drive unit 12 and a bracket assembly 14. The bracket assembly 14 supports the drive unit 12 on a transom 16 of a hull 18 of an associated watercraft (not shown) such that a propeller 20 is in a submerged position with the watercraft resting relative to a surface of a body of water. The drive unit 12 can be trimmed up or down relative to the hull 18 by linear actuators 22 of the bracket assembly 14 about a tilt/trim axis 24 extending generally horizontally. The drive unit 12 can also be tilted up or down relative to the hull 18 by a rotary actuator 26 of the bracket assembly 14 about the tilt/trim axis 24. The drive unit 12 can also be steered to port or to starboard relative to the hull 18 by another rotary actuator 28 of the bracket assembly 14 about a steering axis 30. The steering axis 30 extends generally perpendicularly to the tilt/trim axis 24. When the drive unit 12 is in the upright position as shown, the steering axis 30 extends generally vertically. The actuators 22, 26 and 28 are hydraulic actuators, but other types of actuators are contemplated, such as, but not limited to, electrical actuators. It is contemplated that the actuator 26 and/or the actuator 28 could be replaced by linear actuators. It is also contemplated that the actuators 22 could be omitted.

The drive unit 12 includes an upper portion 32 and a lower portion 34. The upper portion 32 includes an engine 36 (schematically shown in dotted lines) surrounded and protected by a cowling 38. The engine 36 housed within the cowling 38 is an internal combustion engine, such as a two-stroke or four-stroke engine, having cylinders extending horizontally. It is contemplated that other types of engine could be used and that the cylinders could be oriented differently. It is also contemplated that other types of motors could be used instead of the engine 36, such as an electric motor. The lower portion 34 includes the gear case assembly 100 and the exhaust housing 42, which extends from the upper portion 32 to the gear case assembly 100. The gear case assembly 100 will be described in more detail below.

The engine 36 is coupled to a driveshaft 102 (schematically shown in dotted lines in FIG. 2). When the drive unit 12 is in the upright position as shown, the driveshaft 102 is oriented vertically. It is contemplated that the driveshaft 102 could be oriented differently relative to the engine 36. The driveshaft 102 is coupled to a transmission 104 (schematically shown in FIG. 2 and described in more detail below). The transmission 104 drives a propeller shaft 106 (schematically shown in FIG. 2). The propeller 20 is mounted on the propeller shaft 106. In the embodiment of FIG. 2, the propeller shaft 106 is perpendicular to the driveshaft 102, however it is contemplated that it could be at other angles. The driveshaft 102 and the transmission 104 transfer the power of the engine 36 to the propeller 20 mounted on the rear side of the gear case assembly 100 of the drive unit 12. It is contemplated that the propulsion system of the outboard motor 10 could alternatively include a jet propulsion device, turbine or other known propelling device. It is further contemplated that the propeller 20 could alternatively be an impeller.

To facilitate the installation of the outboard motor 10 on the watercraft, the outboard motor 10 is provided with a box 48. The box 48 is connected above the rotary actuator 26. As a result, the box 48 pivots about the tilt/trim axis 24 when the outboard motor 10 is tilted, but does not pivot about the steering axis 30 when the outboard motor 10 is steered. It is contemplated that the box 48 could be mounted elsewhere on the bracket assembly 14 or on the drive unit 12. Devices located inside the cowling 38 which need to be connected to other devices disposed externally of the outboard motor 10, such as on the deck or hull 18 of the watercraft, are provided with lines which extend inside the box 48. It is contemplated that the box 48 could be omitted.

Other known components of an engine assembly are included within the cowling 38, such as a starter motor, an alternator and the exhaust system. As it is believed that these components would be readily recognized by one of ordinary skill in the art, further explanation and description of these components will not be provided herein.

The bracket assembly 14 includes a swivel bracket 50 pivotally connected to a stern bracket 52 via the rotary actuator 26. The stern bracket 52 includes a plurality of holes and slots (not shown) adapted to receive fasteners (not shown) used to fasten the bracket assembly 14 to the transom 16 of the watercraft. By providing many holes and slots, the vertical position of the stern bracket 52, and therefore of the bracket assembly 14, relative to the transom 16 can be adjusted. Upper and lower drive unit mounting brackets 78, 80 are fastened to the drive unit 12 so as to support the drive unit 12 onto the bracket assembly 14.

Figure 3:
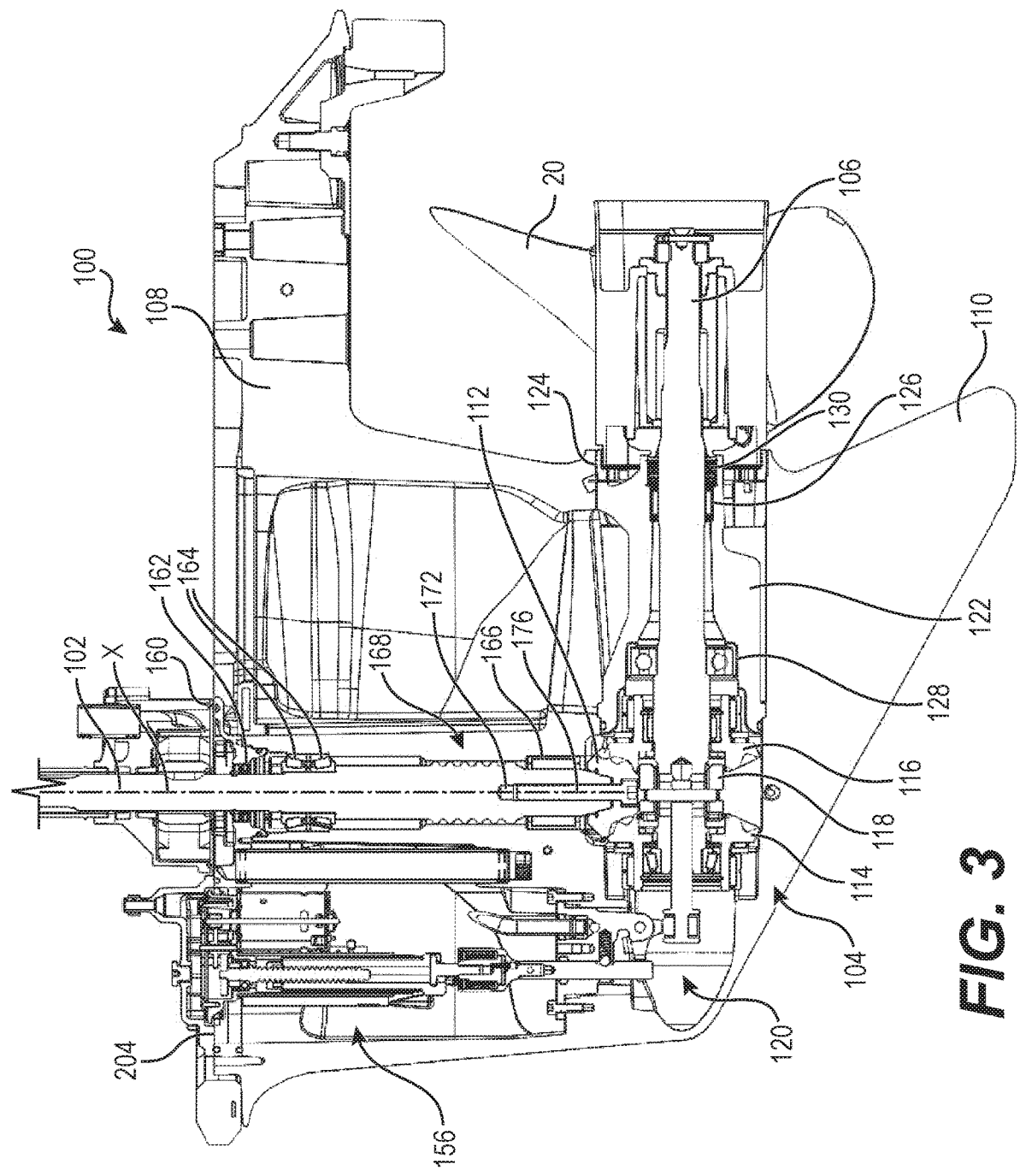
FIG. 3 is a cross-sectional view of a gear case assembly of the outboard motor of FIG. 2.
Figure 4:
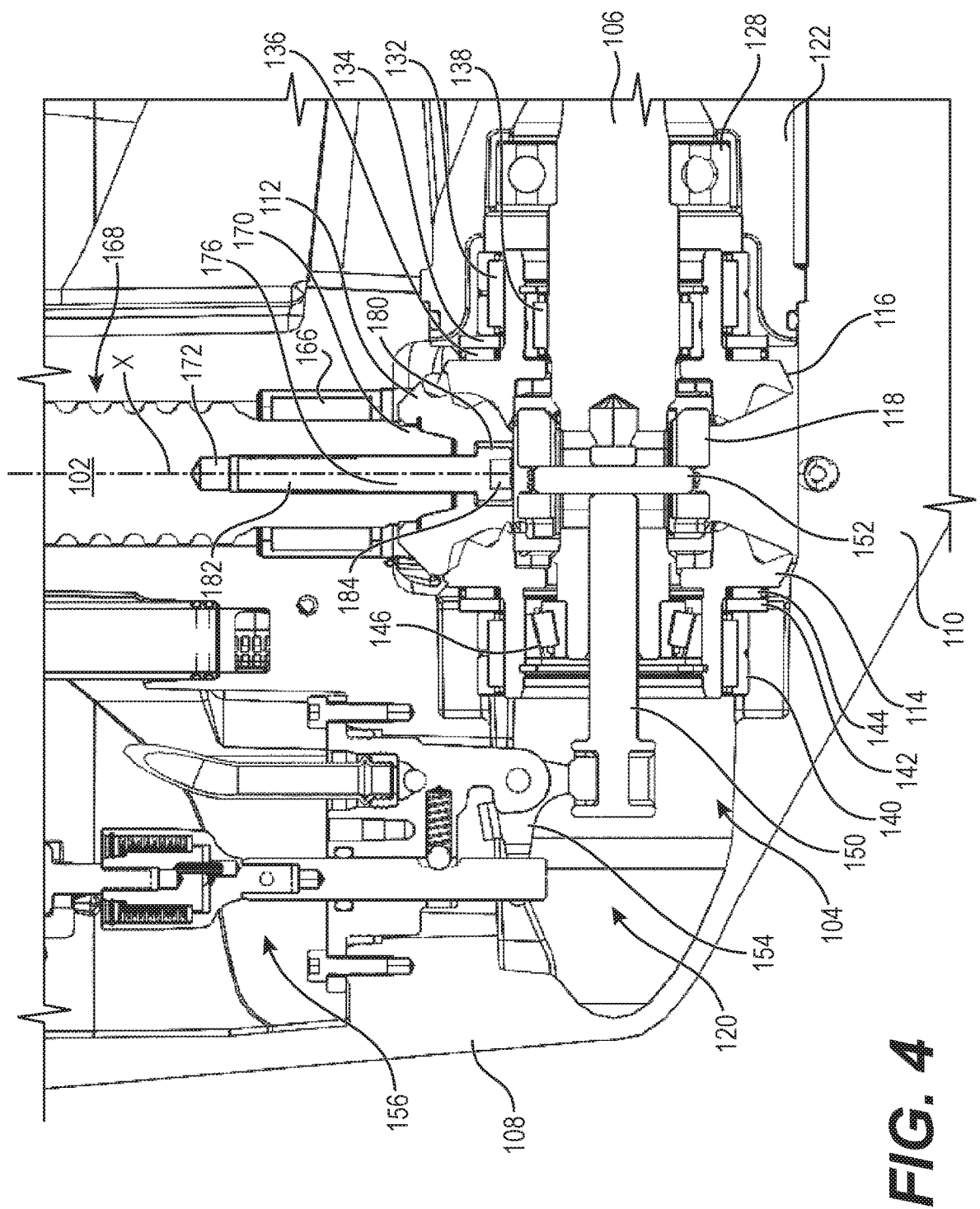
FIG. 4 is a close-up of the cross-sectional view of the gear case assembly of FIG. 3 showing transmission components.

Turning now to FIGS. 3 and 4, the gear case assembly 100 will be described in more detail. The gear case assembly 100 includes the driveshaft 102, the transmission 104, the propeller shaft 106, a gear case housing 108 and other components described below.

The gear case housing 108 defines internal volumes inside which the driveshaft 102 and propeller shaft 106 are received in part and inside which the transmission 104 is received. The lower part of the gear case housing 108 has a skeg 110. The gear case housing 108 is made by a metal casting process, but other manufacturing methods are contemplated.

The driveshaft 102 has a lower end extending in the gear case housing 108 and the opposite end operatively connected to the engine 36. A majority of the propeller shaft 106 extends in the gear case housing 108 perpendicularly to the driveshaft 102. The rear end of the propeller shaft 106 extends out of the gear case housing 108 such that the propeller 20 can be fastened thereon. The lower end of the driveshaft 102 drives the transmission 104 which in turn drives the propeller shaft 106.

The transmission 104 includes a pinion 112, a front bevel gear 114, a rear bevel gear 116, a clutch dog 118, and a shifting mechanism 120. The pinion 112 is mounted to the lower end of the driveshaft 102 as will be described in greater detail below. The pinion 112 meshes with the front and rear bevel gears 114, 116. In the present embodiment, the pinion 112 and the bevel gears 114, 116 are spiral bevel gears, but other types of gears are contemplated. The bevel gears 114, 116 are rotationally mounted to the propeller shaft 106, as will be described in more detail below. A driveshaft axis X (FIG. 3) of the driveshaft 102 extends between the bevel gears 114, 116. The clutch dog 118 is splined onto the propeller shaft 218 between the two bevel gears 114, 116, such that the clutch dog 118 is rotationally fixed to the propeller shaft 106 and is axially movable along the propeller shaft 106. The shifting mechanism 120 is connected to the clutch dog 118 and moves the clutch dog 118 axially along the propeller shaft 106 between a front position, a rear position and a neutral position. In the neutral position, the clutch dog 118 is disengaged from both bevel gears 114, 116 and the driveshaft 102 does not drive the propeller shaft 106. In the front position, the clutch dog 118 engages the front bevel gear 114 such that the driveshaft 102 drives the propeller shaft 106 in a first direction via the front bevel gear 114. In the rear position, the clutch dog 118 engages the rear bevel gear 116 such that the driveshaft 102 drives the propeller shaft 106 in a second direction, opposite the first direction, via the rear bevel gear 116.

It is contemplated that in other embodiments the rear bevel 116 could be omitted. In such embodiments, the clutch dog 118 only has a front position and a neutral position. It is contemplated that in embodiments where the rear bevel gear 116 is omitted, the front bevel gear 114 could be rotationally fixed to the propeller shaft 106, in which case clutch dog 118 and the shifting mechanism 120 would be omitted.

The propeller shaft 106 is rotationally supported by a propeller shaft housing 122. The propeller shaft housing 122 is disposed inside the gear case housing 108. The propeller shaft housing 122 is held in the gear case housing 108 by a spanner nut 124 having external threads that is provided behind the propeller shaft housing 122. The propeller shaft 106 is rotationally supported in the propeller shaft housing 122 by a needle bearing 126 near a rear of the propeller shaft housing 122 and by a ball bearing 128 near a front of the propeller shaft housing 122. Seals 130 are provided between the propeller shaft 106 and the propeller shaft housing 122 behind the needle bearing 126.

As shown in FIG. 4, the rear bevel gear 116 is rotationally supported in the propeller shaft housing 122 by a needle bearing 132, a thrust washer 134 and a thrust bearing 136. The needle bearing 132 is disposed radially between the rear bevel gear 116 and the propeller shaft housing 122. The thrust bearing 136 is disposed axially between the rear bevel gear 116 and the thrust washer 134. The thrust washer 134 is disposed axially between the thrust bearing 136 and the needle bearing 132. The propeller shaft 106 extends through the rear bevel gear 116. A radial roller bearing 138 is disposed radially between the propeller shaft 106 and the rear bevel gear 116. It is contemplated that the radial roller bearing 138 could be omitted.

As also shown in FIG. 4, the front bevel gear 114 is rotationally supported in the gear case housing 108 by a needle bearing 140, a thrust washer 142 and a thrust bearing 144. The needle bearing 140 is disposed radially between the front bevel gear 114 and the gear case housing 108. The thrust bearing 144 is disposed axially between the front bevel gear 114 and the thrust washer 142. The thrust washer 142 is disposed axially between the thrust bearing 144 and the needle bearing 140. The propeller shaft 106 extends in the front bevel gear 114. A tapered-roller bearing 146 is disposed radially between the propeller shaft 106 and the front bevel gear 114.

It is contemplated that the propeller shaft 106 and the bevel gears 114, 116 could be rotationally supported in the gear case housing 108 differently than described above.

The shifting mechanism 120 includes a shift shaft 150, a pin 152, a lever 154 and a lead screw actuator assembly 156. As best seen in FIG. 4, the shift shaft 150 extends through the front end of the propeller shaft 106. The shift shaft 150 is connected to the clutch dog 118 by the pin 152. The front of the shift shaft 150 is operatively connected to the lever 154. The lever 154 is operatively connected to the lead screw actuator assembly 156. As can be seen in FIG. 3, the lead screw actuator assembly 156 is disposed in the gear case housing 108 forward of the driveshaft 102. Actuation of the lead screw actuator assembly 156 moves the lever 154, which in turn causes the shift shaft 150 to move axially inside the propeller shaft 106, which moves the clutch dog 118 along the propeller shaft 106 via the pin 152. It is contemplated that other types of shifting mechanisms could be used.

Figure 5:
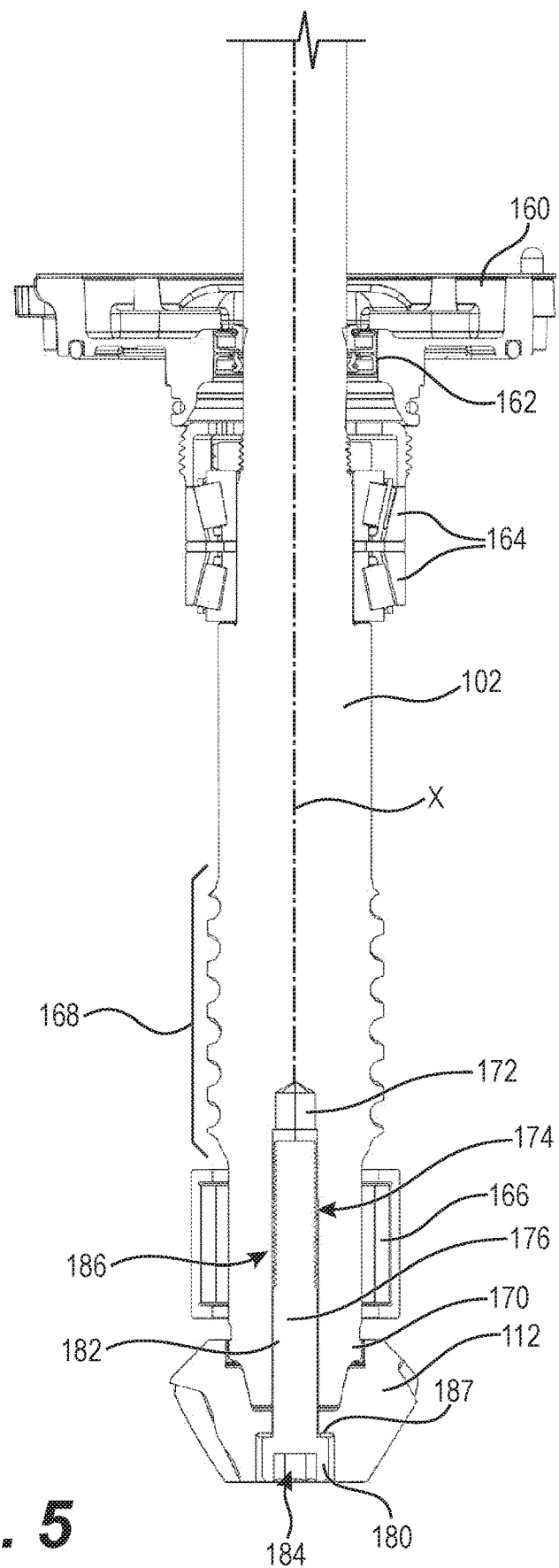
FIG. 5 is a cross-sectional view of a driveshaft and pinion assembly of the gear case assembly of FIG. 3.

With reference to FIGS. 3 and 5, the driveshaft 102 extends through an annular cap 160 provided at the top of the gear case housing 108. Seals 162 are provided radially between the driveshaft 102 and the annular cap 160. The driveshaft 102 is rotationally supported in the gear case housing 108 by a pair of tapered-roller bearings 164. The tapered-roller bearings 164 are disposed radially between the driveshaft 102 and the gear case housing 108, below the annular cap 160. The lower end of the driveshaft 102 is rotationally supported in the gear case housing 108 by a needle bearing 166. The needle bearing 166 is disposed radially between the driveshaft 102 and the gear case housing 108, above the pinion 112. It is contemplated that the driveshaft 102 could be rotationally supported in the gear case housing 108 differently.

The driveshaft 102 defines a screw pump 168 between the bearings 164 and the bearing 166 for pumping lubricant along the driveshaft 102. As best seen in FIG. 5, the bearing 166 is disposed completely between the pinion 112 and the screw pump 168 in the direction defined by the driveshaft axis X.

Figure 8:
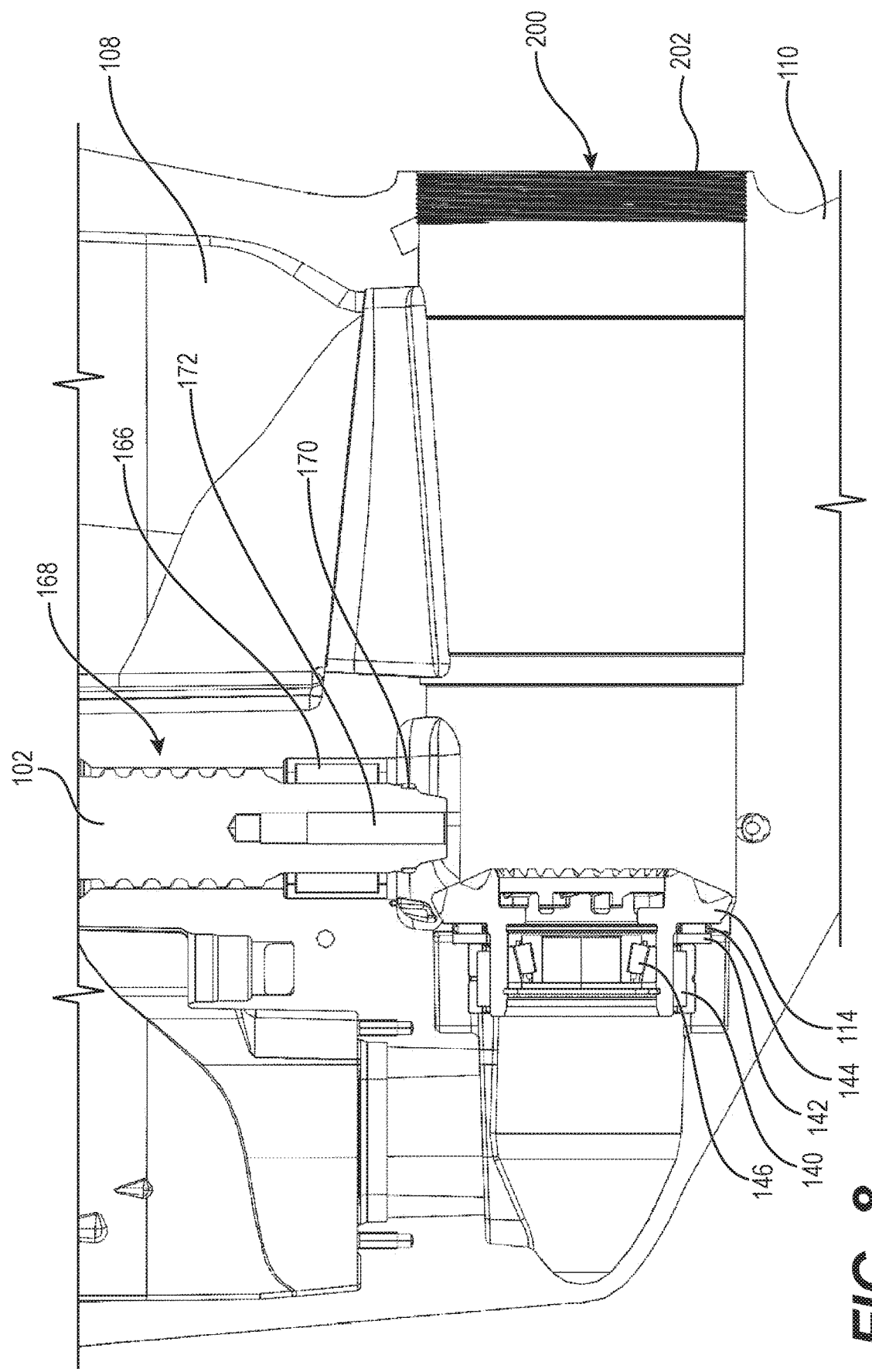
FIGS. 8 and 9 are cross-sectional views illustrating steps of assembly of the gear case assembly of FIG. 3.

As best seen in FIGS. 5 and 8, the lower end of the driveshaft 102 has external splines 170 below the bearing 166. As can also be seen in FIG. 5, the lower end of the driveshaft 102 is frustoconical below the external splines 170. The lower end of the driveshaft 102 defines a bore 172 that is coaxial with the driveshaft 102 and which opens in the extremity of the lower end of the driveshaft 102. The bore 172 has an internally threaded portion 174. As can be seen, the bore 172 extends above the bearing 166 into the portion of the driveshaft 102 defining the screw pump 168.

With reference to FIGS. 4 and 5, a connection of the pinion 112 to the lower end of the driveshaft 102 will be described. As can be seen, the pinion 112 is fastened to the lower end of the driveshaft 102 by a threaded fastener 176. The fastener 176 extends through a central aperture 178 (FIG. 6) of the pinion 112 and into the bore 172 of the driveshaft 102. The fastener 176 is threaded into the threaded portion 174 of the bore 172 of the driveshaft.

In the present embodiment, the fastener 176 is a socket screw having a head 180 and a shank 182. The head 180 defines a socket 184. In the present embodiment, the socket 184 is hexagonal in shape, but other shapes are contemplated. It is also contemplated that the head 180 could define another type of recess for receiving a tool used to fasten the fastener 176 in the driveshaft 102. For example, the recess could be a slot such as in a slotted screw or a cross such as in a Phillips screw. It is also contemplated that the head 180 could not define a recess, such as in an external hex drive screw or a twelve-point flange head cap screw. The shank 182 has a threaded portion 186 that is complementary with the threaded portion 174 of the bore 172 of the driveshaft 102. Other types of fasteners having a head and a shank are contemplated.

As can be seen, in FIGS. 4 and 5, part of the pinion 112 is held between the head 180 of the fastener 176 and the lower end of the driveshaft 102. A washer 187 (FIG. 5) is disposed between the head 180 of the fastener 176 and the pinion 112. The socket 184 of the head 180 of the fastener 176 is oriented so as to face the propeller shaft 106 in order to be accessible with a tool used to fasten or unfastened the fastener 176. In the present embodiment, the shank 182 extends into the bore 172 of the driveshaft 102 such that a free end (i.e. the upper end) of the shank 182 is above the bearing 166. As such, the bearing 166 is disposed completely between the pinion 112 and the free end of the shank 182 in the direction defined by the driveshaft axis X. In the present embodiment, the shank 182 extends into the portion of the driveshaft 102 that defines the screw pump 168. It is contemplated that the shank 182 could extend higher or lower in the driveshaft 102 than illustrated.

Figure 6:
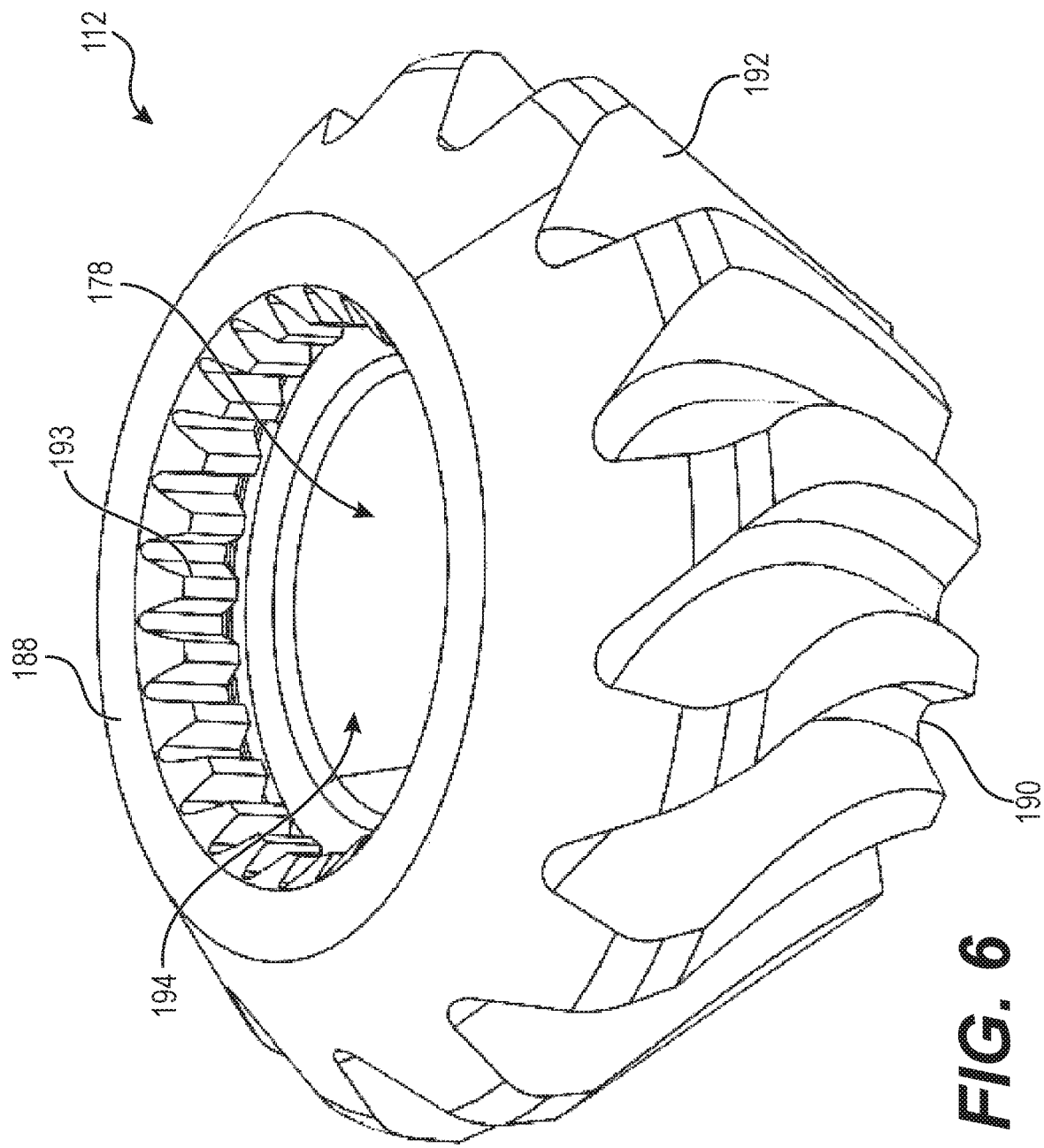
FIG. 6 is perspective view of a pinion of the gear case assembly of FIG. 3.
Figure 7:
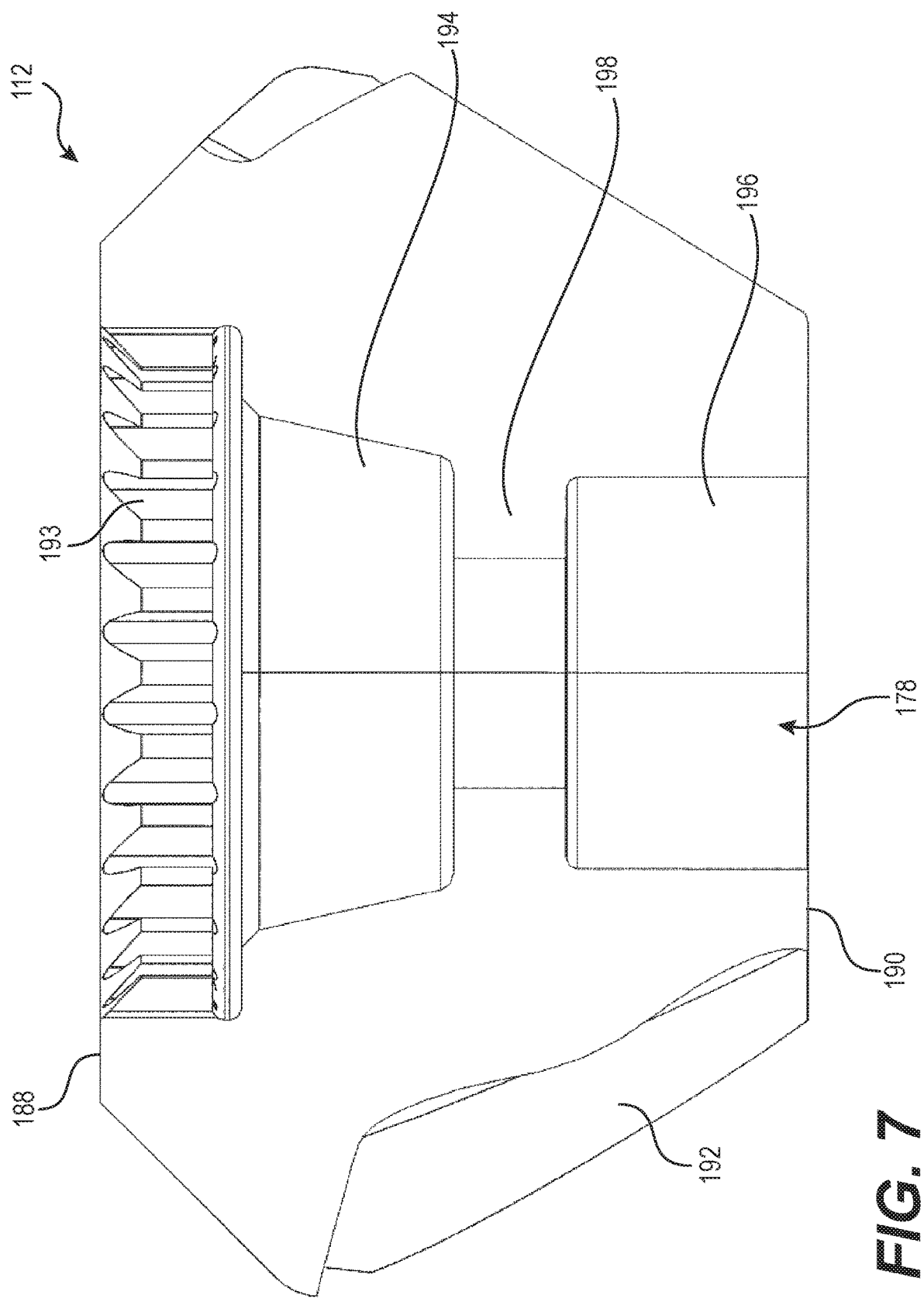
FIG. 7 is a cross-sectional view of the pinion of FIG. 6.

With reference to FIGS. 6 and 7, the pinion 112 has upper and lower faces 188, 190. Teeth 192 of the pinion 112 extend between these opposed faces 188, 190. The central aperture 178 of the pinion 112 opens into both faces 188, 190. The upper end of the central aperture 178 has internal splines 193. The central aperture 178 has a portion 194 below the splines 193 that is frustoconical. A lower portion of the central aperture 178 is a counterbore 196 that is cylindrical. The pinion 112 defines an inwardly extending ring 198 between the frustoconical portion 194 and the counterbore 196. As can be seen in FIG. 7, the inner diameter of the ring 198 is smaller than a counterbore diameter of the counterbore 196 and is also smaller than a minor diameter of the frustoconical portion 194 (i.e. the smallest diameter of the frustoconical portion 194).

As can be seen in FIGS. 4 and 5, the lower end of the driveshaft 102 is received in the central aperture 178 of the pinion 112. More specifically, the frustoconical portion of the lower end of the driveshaft 102 is received in the frustoconical portion 194 of the pinion 112. The extremity of the lower end of the driveshaft 102 abuts the top of the ring 198 of the pinion 112. The counterbore diameter of the counterbore 196 is smaller than an end diameter of the extremity of the lower end of the driveshaft 102. The external splines 170 of the driveshaft 102 engage the internal splines 193 of the pinion 112.

A head diameter of the head 180 of the fastener 176 is smaller than a counterbore diameter of the counterbore 196 such that the head 180 is received in the counterbore 196. In the present embodiment, the head 180 of the fastener 176 is disposed completely between the opposed faces 188, 190 of the pinion 112. It is contemplated that the head 180 of the fastener 176 could protrude at least in part below the face 190 of the pinion 112. In order for the lower face 190 to have a diameter as small as possible, a radial gap between the head 180 of the fastener 176 and the wall defining the counterbore 196 is kept small. In some embodiment, a ratio of the head diameter of the head 180 to the counterbore diameter of the counterbore 196 is greater than 0.80. The ring 198 of the pinion 112 is held between the head 180 of the fastener 176 and the lower end of the driveshaft 102. The washer 187 is disposed between the head 180 of the fastener 176 and the bottom of the ring 198. The shank 182 passes through the ring 198 and into the bore 172 of the driveshaft 102.

Figure 9:
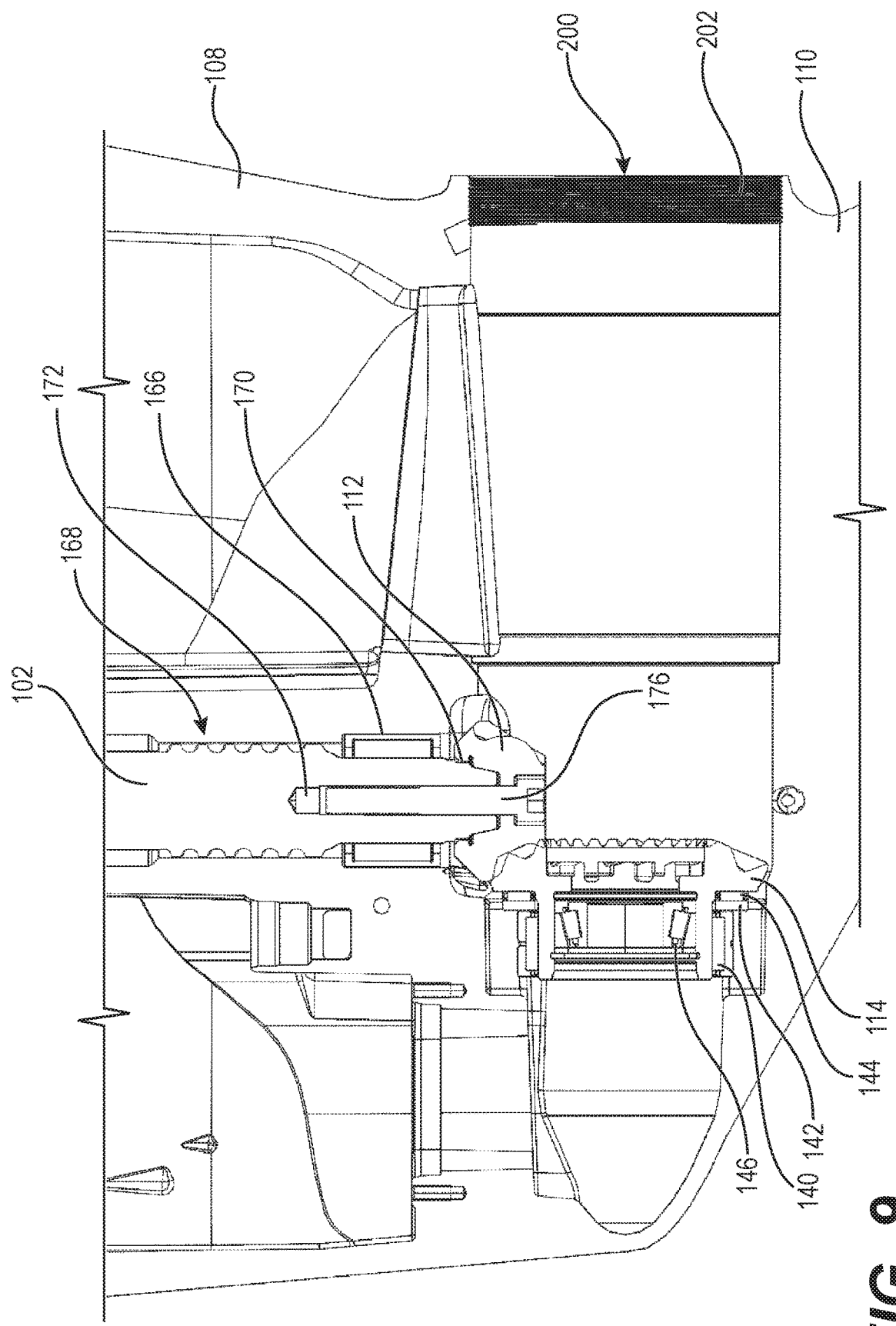

Turning now to FIGS. 3, 4, 8 and 9, the steps of assembly of the gear case assembly 100 will be briefly described. With reference to FIG. 8, the bearings 140 and 166 are first installed in the gear case housing 108. The bearings 140, 166 are inserted in the gear case housing 108 via a rear opening 200 of the gear case housing 108. Then, the bevel gear 114, the thrust washer 142 and the bearings 144, 146, which have been pre-assembled together, are installed in the gear case housing 108 via the opening 200. Then, the driveshaft 102 is installed in the gear case housing 108 via an opening in the top of the gear case housing 108 (i.e. the opening which is closed by the cap 160 in FIG. 3) such that the lower end of the driveshaft 102 is inserted in the bearing 166. The bearing 164 and the seals 162 are then installed into the gear case housing 108 around the driveshaft 102 via the opening in the top of the gear case housing 108. For the remaining steps of assembly, the components are inserted into the gear case housing 108 via the opening 200, unless specified otherwise. With reference to FIG. 9, the pinion 112 is then positioned onto the lower end of the driveshaft 102 such that the pinion 112 meshes with the bevel gear 114 and the splines 193 of the pinion 112 engage the splines 170 of the driveshaft 102. The pinion 112 is then fastened to the driveshaft 102 using the fastener 176. The tool used to fasten the fastener 176 is also inserted through the opening 200 in the gear case housing 108. Then, the propeller shaft 106, the clutch dog 118, the pin 152 and the shift shaft 150, which have been pre-assembled together, are installed in the gear case housing 108 such that the front end of the propeller shaft 106 is received in the bearing 146 as shown in FIG. 4. Then, the bevel gear 116, the thrust washer 134 and the bearing 136, which have been pre-assembled together, are installed in the gear case housing 108 over the propeller shaft 106 such that the bevel gear 116 meshes with the pinion 112. Then, the propeller shaft housing 122, the seals 130 and the bearings 126, 128, 132, 138, which have been pre-assembled together, are installed in the gear case housing 108 over the propeller shaft 106 and, where applicable, the bevel gear 116. The spanner nut 124 is screwed into the threads 202 (FIG. 8) provided adjacent to the opening 200. The lever 154, the actuator assembly 156 and associated components of the shifting mechanism 120 are installed in the gear case housing 108 via an opening 204 (FIG. 3) in a top of the gear case housing 108 and are connected to the shift shaft 150. The annular cap 160 is then disposed around the driveshaft 102 at the top of the gear case housing 108. It is contemplated that the order of some of the steps could be different than described above. It is also contemplated that some of the components which have been described as being installed in the gear case housing 108 as part of a pre-assembled unit could be installed individually or separately from a pre-assembled unit having less components.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A gear case assembly for a watercraft propulsion system comprising:
   a gear case housing;

a driveshaft extending at least in part into the gear case housing, the driveshaft defining a bore in an end thereof, the bore being at least partially threaded, the bore being coaxial with the driveshaft;

a propeller shaft having a first portion extending into the gear case housing and a second portion extending out of the gear case housing, the propeller shaft and the driveshaft being angled relative to each other;

a bevel gear mounted to the propeller shaft;

a pinion mounted to the end of the driveshaft, the pinion meshing with the bevel gear, the pinion defining a central aperture; and a fastener disposed at least in part in the central aperture of the pinion, the fastener fastening the pinion to the end of the driveshaft, the fastener comprising a head and a shank, the shank being at least partially threaded, the shank extending into the bore of the driveshaft.

2. The gear case assembly of claim 1, wherein a portion of the pinion is held between the head of the fastener and the end of the driveshaft.

3. The gear case assembly of claim 1, wherein the fastener is a screw.

4. The gear case assembly of claim 3, wherein:
the screw is a socket screw; and
the head of the fastener defines a socket.

5. The gear case assembly of claim 1, wherein:
the central aperture of the pinion has a counterbore;
the head of the fastener is received in the counterbore; and
the head of the fastener is disposed completely between opposed faces of the pinion.

6. The gear case assembly of claim 1, wherein:
the central aperture of the pinion has a counterbore;
the head of the fastener is received in the counterbore;
the counterbore has a counterbore diameter;
the head of the fastener has a head diameter; and
a ratio of the head diameter to the counterbore diameter is greater than 0.8.

7. The gear case assembly of claim 1, wherein:
the head of the fastener defines a recess for receiving a tool used to fasten the fastener in the driveshaft; and
the recess faces the propeller shaft.

8. The gear case assembly of claim 1, wherein the end of the driveshaft is received in the central aperture of the pinion.

9. The gear case assembly of claim 8, wherein:
the end of the driveshaft is frustoconical; and
a portion of the central aperture receiving the end of the driveshaft is frustoconical.

10. The gear case assembly of claim 9, wherein:
the head of the fastener is received at least in part in the central aperture of the pinion; and
a portion of the central aperture of the pinion receiving the head of the fastener is cylindrical.

11. The gear case assembly of claim 10, wherein:
the pinion defines a ring disposed between the frustoconical and cylindrical portions of the central aperture of the pinion;
an inner diameter of the ring is smaller than a diameter of the cylindrical portion;
the inner diameter of the ring is smaller than a minor diameter of the frustoconical portion; and
the ring is held between the head of the fastener and the end of the driveshaft.

12. The gear case assembly of claim 8, wherein:
the end of the driveshaft has external splines; and
the central aperture of the pinion has internal splines engaging the external splines of the end of the driveshaft.

13. The gear case assembly of claim 1, further comprising a bearing disposed between the end of the driveshaft and the gear case housing for rotationally supporting the driveshaft in the gear case housing; and
wherein the bearing is disposed completely between the pinion and a free end of the shank of the fastener in a direction defined by a driveshaft axis of the driveshaft.

14. The gear case assembly of claim 1, wherein a portion of the driveshaft defines a screw pump; and
the gear case assembly further comprising a bearing disposed between the end of the driveshaft and the gear case housing for rotationally supporting the driveshaft in the gear case housing, the bearing being disposed completely between the pinion and the screw pump in a direction defined by a driveshaft axis of the driveshaft.

15. The gear case assembly of claim 14, wherein the shank of the fastener extends in part into the portion of the driveshaft defining the screw pump.

16. The gear case assembly of claim 1, wherein the bevel gear is a first bevel gear;
the gear case assembly further comprising:
a first bearing rotationally mounting the first bevel gear to the propeller shaft;
a second bevel gear mounted to the propeller shaft, the second bevel gear meshing with the pinion, a driveshaft axis of the driveshaft extending between the first and second bevel gears;
a second bearing rotationally mounting the second bevel gear to the propeller shaft; and
a clutch dog mounted to the propeller shaft between the first and second bevel gears, the clutch dog being rotationally fixed to the propeller shaft, the clutch dog being axially movable along the propeller shaft between a first position, a second position and a neutral position,
in the first position, the clutch dog engages the first bevel gear such that the driveshaft drives the propeller shaft via the first bevel gear in a first direction,
in the second position, the clutch dog engages the second bevel gear such that the driveshaft drives the propeller shaft via the second bevel gear in a second direction opposite the first direction,
in the neutral direction, the clutch dog is disengaged from the first and second bevel gears.

17. The gear case assembly of claim 1, wherein the pinion and the bevel gear are spiral bevel gears.

18. The gear case assembly of claim 1, wherein:
the central aperture of the pinion has a counterbore;
the head of the fastener is received at least in part in the counterbore;
the counterbore has a counterbore diameter;
the head of the fastener has a head diameter;
an extremity of the end of the driveshaft has an end diameter;
the head diameter is less than the counterbore diameter; and
the counterbore diameter is less than the end diameter.

19. The gear case assembly of claim 1, wherein the propeller shaft is perpendicular to the driveshaft.

20. An outboard motor comprising:
a motor;
a cowling covering at least part of the motor;
the gear case assembly of claim 1;

the driveshaft being operatively connected to the motor; and a propeller mounted to the second portion of the propeller shaft.

* * * * *